US006772519B2

(12) United States Patent
St. James et al.

(10) Patent No.: US 6,772,519 B2
(45) Date of Patent: Aug. 10, 2004

(54) FLEXIBLE HOSE SYSTEM FOR INSTALLING RESIDENTIAL AND COMMERCIAL FACILITY AIR CONDITIONING SYSTEM

(75) Inventors: Michael H. St. James, Tampa, FL (US); Mark R. Holtman, Largo, FL (US)

(73) Assignee: ICO, Tampa, FL (US)

( * ) Notice: Subject to any disclaimer, the term of this patent is extended or adjusted under 35 U.S.C. 154(b) by 0 days.

(21) Appl. No.: 10/282,332

(22) Filed: Oct. 28, 2002

(65) Prior Publication Data

US 2004/0078974 A1 Apr. 29, 2004

(51) Int. Cl.[7] .......................... B21D 51/16; F16L 33/00
(52) U.S. Cl. ............... 29/890.144; 29/890.14; 29/508; 285/256; 285/241; 285/242
(58) Field of Search ........................ 29/890.14, 890.144, 29/890.141, 890.145, 890.147, 505, 506, 508, 520; 62/77, 292, 263; 285/32, 256, 241, 242, 252; 24/19

(56) References Cited

U.S. PATENT DOCUMENTS 3,549,180 A * 12/1970 MacWilliam ............... 285/256
3,935,713 A * 2/1976 Olson ............................ 62/77
4,022,496 A * 5/1977 Crissy et al. .................. 285/3
4,607,867 A * 8/1986 Jansen ......................... 285/242
5,191,770 A * 3/1993 Kim ............................ 62/263
6,010,162 A * 1/2000 Grau et al. .................. 285/257

* cited by examiner

*Primary Examiner*—Irene Cuda Rosenbaum
*Assistant Examiner*—Marc Jimenez
(74) *Attorney, Agent, or Firm*—Dennis G. LaPointe; Mason Law, P.L.

(57) ABSTRACT

The invention is a system and associated connection fitting for connecting a refrigerated line or air conditioning hose to the compressor unit or component on one end and the evaporator unit or component on the other end of a residential or commercial air conditioning or refrigeration system. The hose will be of a construction, which as well as having a relatively high bursting strength, will also not allow the refrigerant to permeate through the hose and escape into the outside environment. The associated connecting fitting allows the hose to be connected to the compressor/evaporator unit. The mounting surface of the fitting will allow it to either slide over or fit into the corresponding fitting on the compressor and/or evaporator unit. The opposite end, which shall connect to the hose assembly, will have flanges and "O" rings which when clamped will provide a secure connection as well as prevent loss of refrigeration.

3 Claims, 6 Drawing Sheets

FLEXIBLE HOSE SYSTEM FOR INSTALLING RESIDENTIAL AND COMMERCIAL FACILITY AIR CONDITIONING SYSTEM

This invention relates to refrigerant transmission components designed as a complete transmission system. More particularly, the present invention pertains to the hose and hose couplings of a residential and/or commercial refrigeration system.

Components for the transmission of refrigerant in residential and commercial systems are well known. Typically, these systems rely on heavy duty copper tube or pipe with the associated fittings. Systems and methods for installation of refrigeration systems are very inefficient, wasteful, and time consuming. These systems are also prone to leakage from inadequately soldered joints. Also during the soldering process there is an undetermined amount of material that is flaked off on the inside of the copper lines causing system contamination.

Accordingly, a need exists, especially for use in residential and commercial refrigeration applications for a system which provides increased resistance to high pressure, flexibility of installation, as well as and most importantly, speed and economy of installation.

The present invention provides for a residential or commercial refrigeration compressor/condenser unit to be joined to the evaporator through the use of a specialized fitting welded, typically by brazing or soldering, on one end to the compressor (or evaporator) and clamped to a flexible hose on the other. This flexible hose will connect the compressor/condenser unit or any other refrigeration parts placed between them using a fitting similar in design to the one connecting the compressor to the flexible hose. This is a great time and labor saving benefit especially when expanding an existing system or retrofitting a new one.

The fitting can be made of brass and other materials suitable for high pressure refrigerant lines and once welded to the compressor, condenser, or evaporator units will provide a stable, leak proof platform for the attachment of the flexible hose. The hose will be attached to the fitting and sealed with two internal "O" rings. A clamp positioner will insure that the two clamps will be exactly centered over each "O" ring to provide and maintain a leak proof seal. The hose itself is similar in construction to a commonly produced air conditioning hose such as commercially available Aeroquip part no. GH134. This hose is currently manufactured in four diameters. The use of such a hose not only provides a degree of flexibility not found in copper pipe, but is also over three times stronger than it's copper counterpart with a strength rating of 2500 psi versus barely 800 psi for copper pipe. This strength is very advantageous with the possible regulatory phase-out of R-22 for its replacement R-410A. Similar hoses made by other manufacturers would also work. These hoses are designed and manufactured with materials, which will not allow the refrigerant to permeate through the hose and escape into the outside environment. As an example of the ratings of such a hose, the Aeroquip GH134 hose has an industry agency listing of SAE J2064 Type E Class 1. The inner tube material is nylon with a textile braid reinforcement made from a polyester material. The cover material is a synthetic rubber made from a chlorobutyl and hypalon material. The maximum operating pressure is recommended at less than 500 psi with a burst pressure rating of 2500 psi, a safety factor of 5 to 1. The minimum bend radius is approximately 2 inches. The operating temperature range is between −22° F. to 257° F. (−30° C. to 125° C.). Certainly, any comparable hose suitable for use with refrigerants at the expected operating parameters of the equipment will work. The Aeroquip hose is merely an example of currently known equipment that works well with the present invention. Another typical hose that may be suitable is described in Aeroquip owned U.S. Pat. No. 5,957,164 issued Sep. 28, 1999 to Campbell.

The new R-410A operates at much higher pressures. It is important to note that the strength of copper pipe is diminished by the degree of which it is heated. Because the flexible hose has a woven outer core, sweating is greatly reduced. If additional insulation is added, similar to Armorflex foam covering, it may be possible to increase the systems efficiency and reduce electrical consumption.

Vibration is another factor, which can cause damage to an air conditioning system. Vibration can cause joints to wear and fail, and can create noise throughout the system. And if the system is poorly designed, the compressors own pulsation's can be fed back to the compressor valves. Through is use of flexible hosing, system vibration is eliminated.

Safety is a primary concern for every contractor as well every homeowner. For the contractor, the level of professionalism differs from state to state. For example; Massachusetts requires that every individual be school trained and pass a license exam as opposed to Florida where only one individual in a company is required to hold a current license. No matter how skilled, the technician workplace injuries like serious cuts and burns will always take place. Because there are no sharp edges and minimal brazing required at the equipment connection, lost workdays and decreased productivity is almost eliminated. Further, because no brazing need take place inside of a residence or commercial facility, the risk of collateral damage to the premises is eliminated and liability will be greatly reduced as well. Hopefully, a contractor's liability insurance will also be reduced. This is especially true when performing a restoration or retrofitting/upgrading an existing system.

Cost as well as time is a major concern for the contractor. Because there is essentially no welding involved with the hose system, installation time is greatly reduced. A contractor who is tasked with the plumbing of air conditioning units in a large condominium complex or housing development can reduce installation time from days to hours. The contractor can also accurately estimate his costs and profit. This is easily accomplished because the hose can be cut to the exact length and fittings ordered to match the number of units being installed. Inventory costs can be reduced because extra fittings and copper tubing is no longer required to be kept on hand. The inventory of equipment such as torches, gas, brazing rods and solder is significantly reduced. All tools required for installation can fit in the technicians pocket or working pouch. The requirement for large vans to transport extraneous equipment can now be replaced with smaller economical fuel-efficient vehicles.

Figure 1:
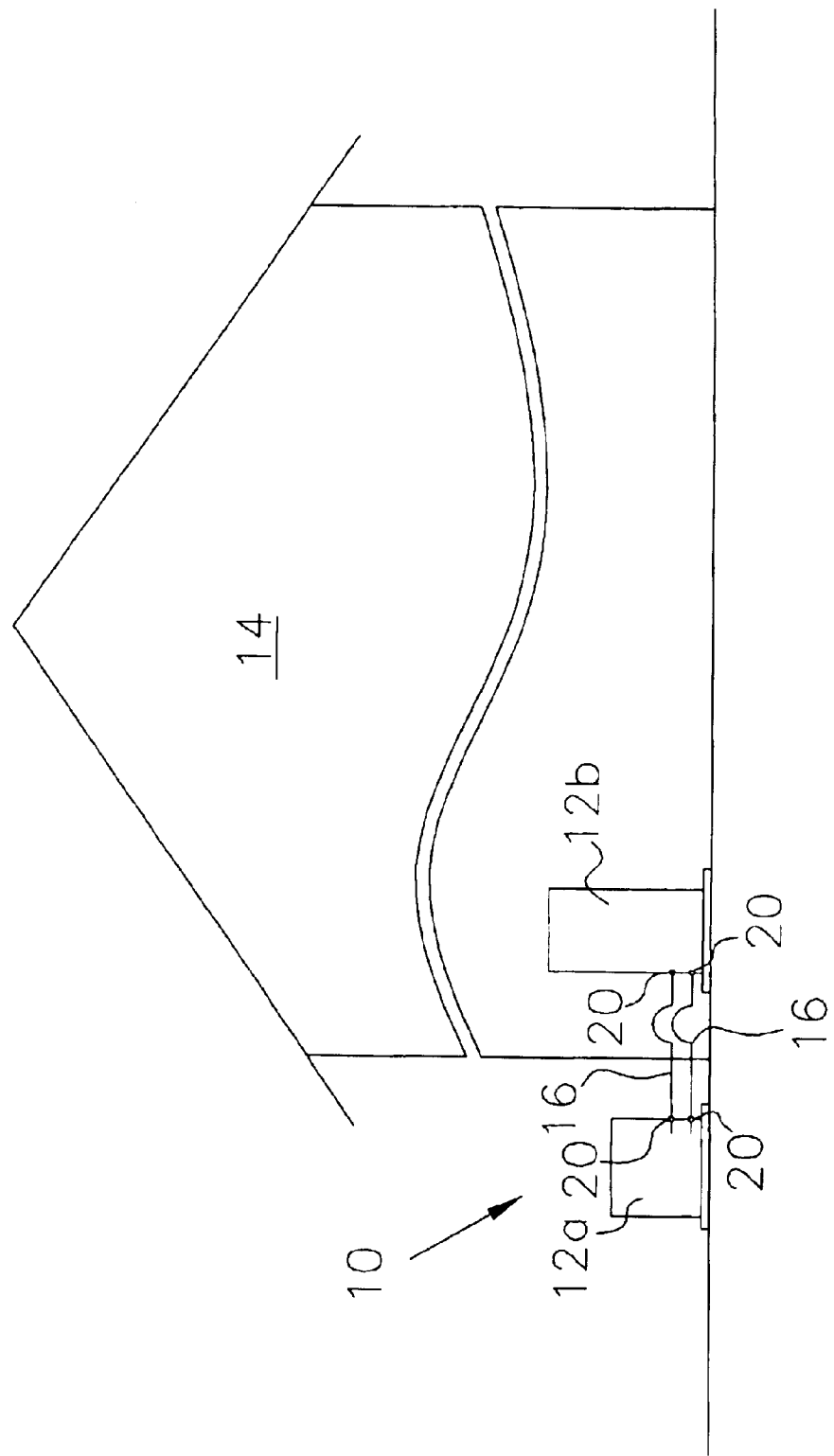
FIG. 1 is a conceptual schematic of the present invention.
Figure 2:
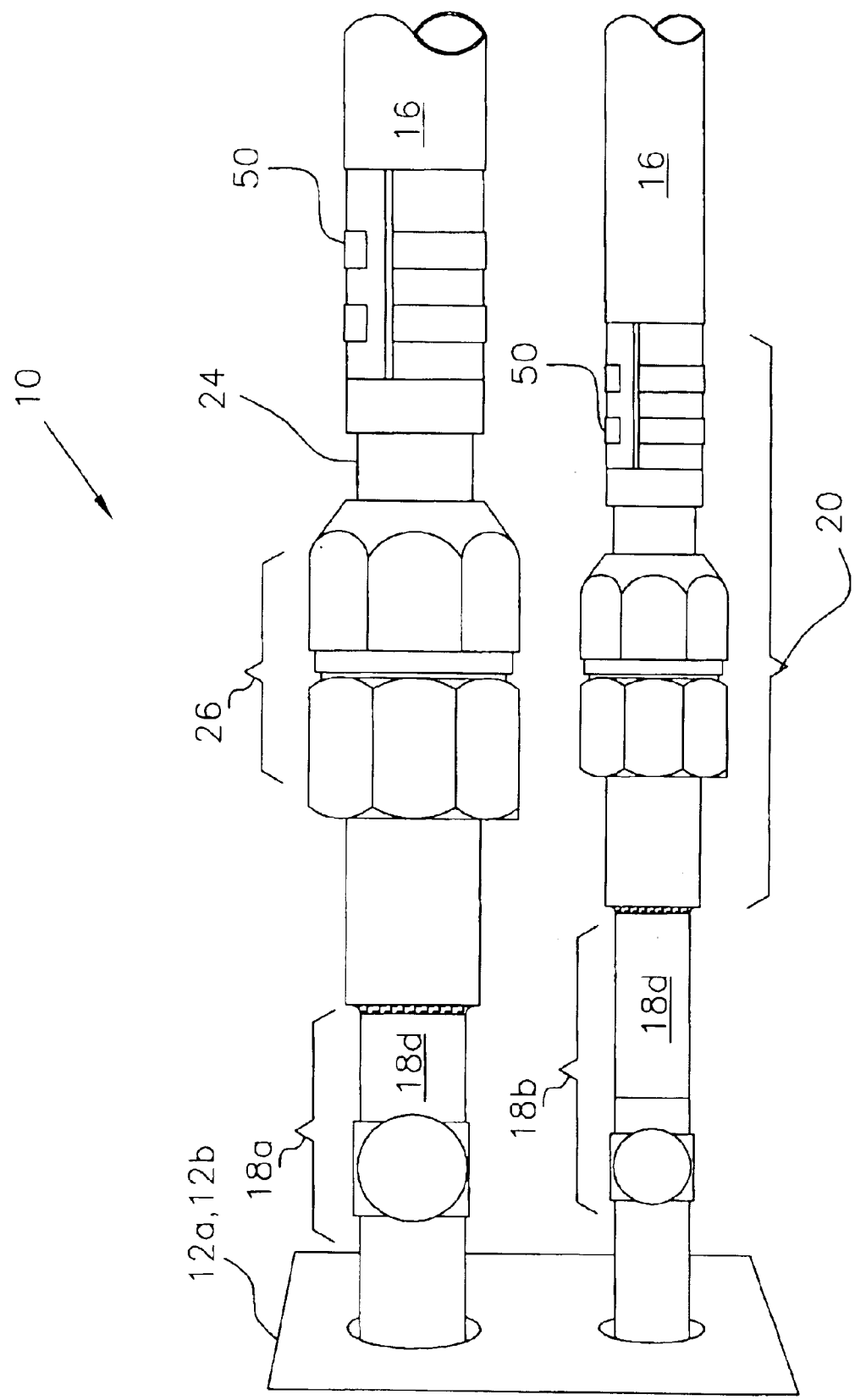
FIG. 2 is a schematic depiction of a typical connection for one embodiment of the invention at either the evaporator side or the condenser/compressor side incorporating a union fitting.
Figure 3:
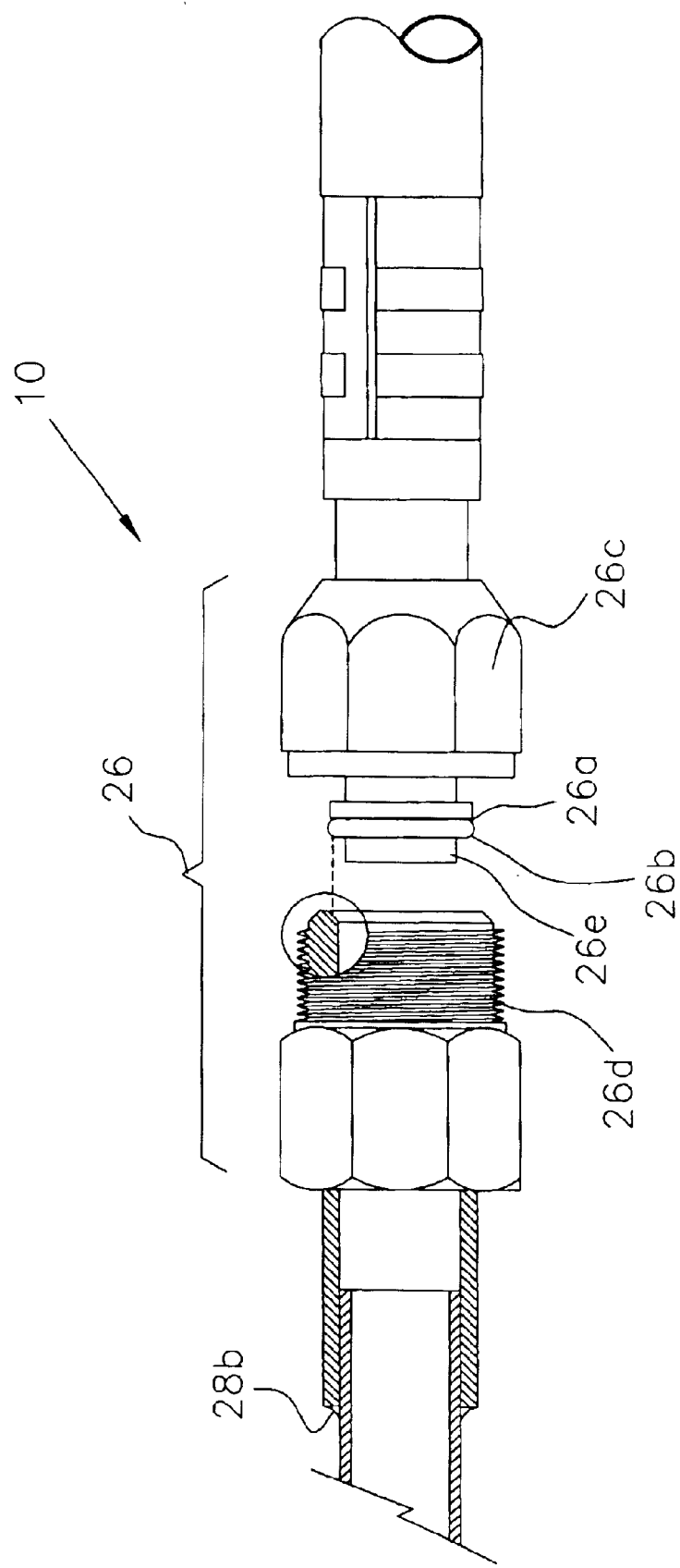
FIG. 3 is an exploded partial cross-section view of one of the connections of FIG. 2.
Figure 4:
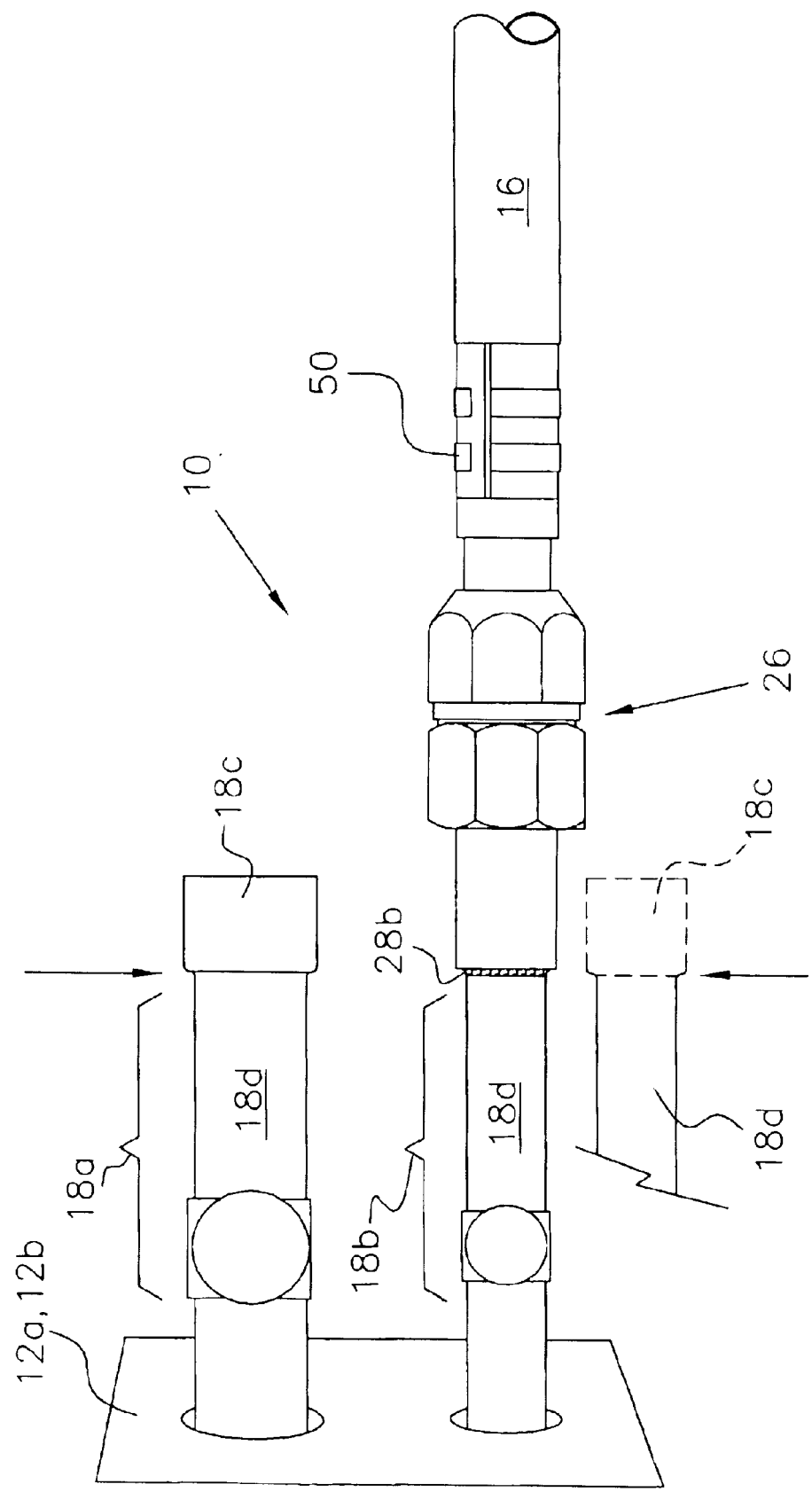
FIG. 4 is a schematic depiction of another embodiment of the invention with a connection of the hose to a fitting connected directly to the unit or equipment, and further depicting cutting off the flare end with the flare being cut off at the location shown by the arrow.
Figure 5:
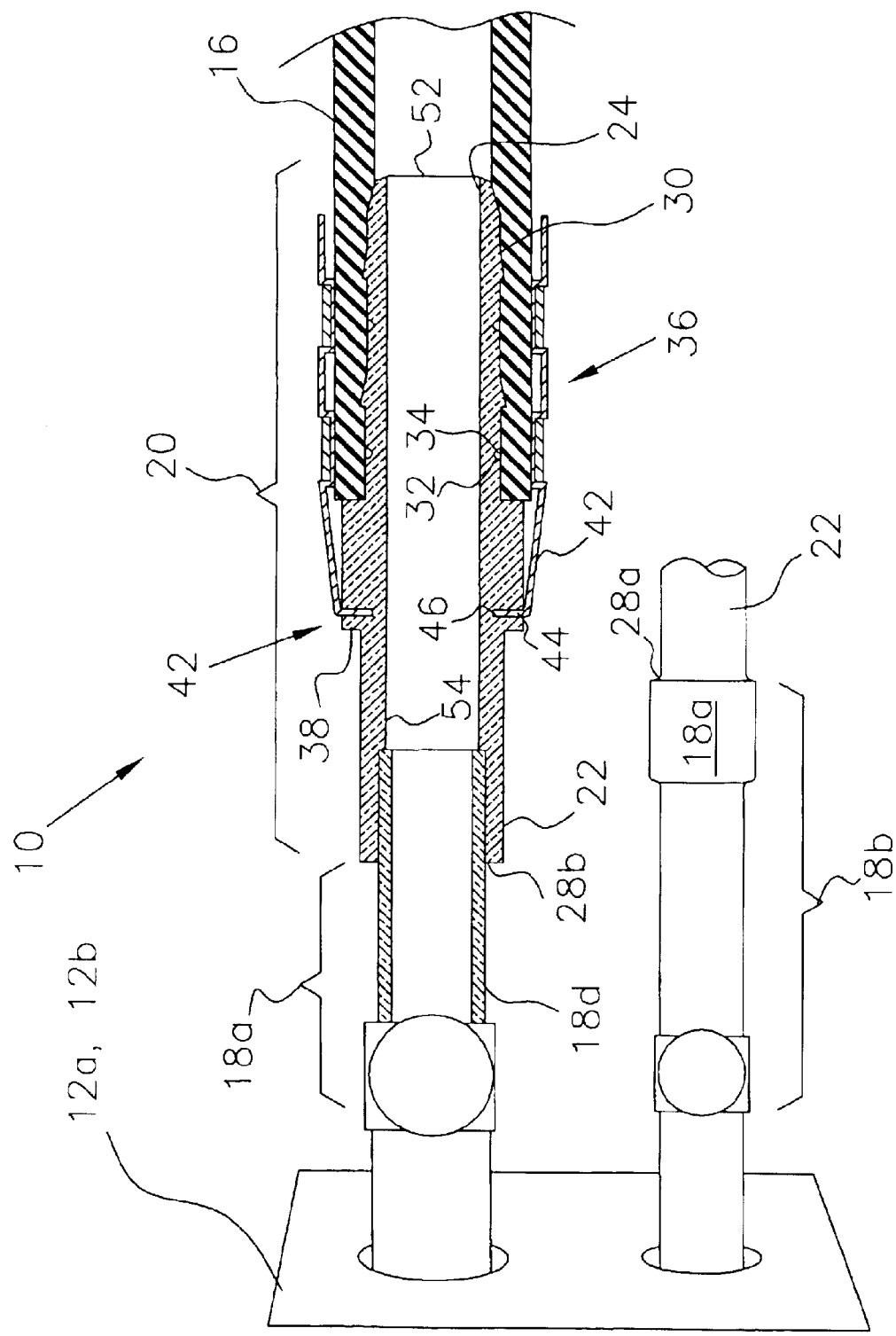
Figure 6:
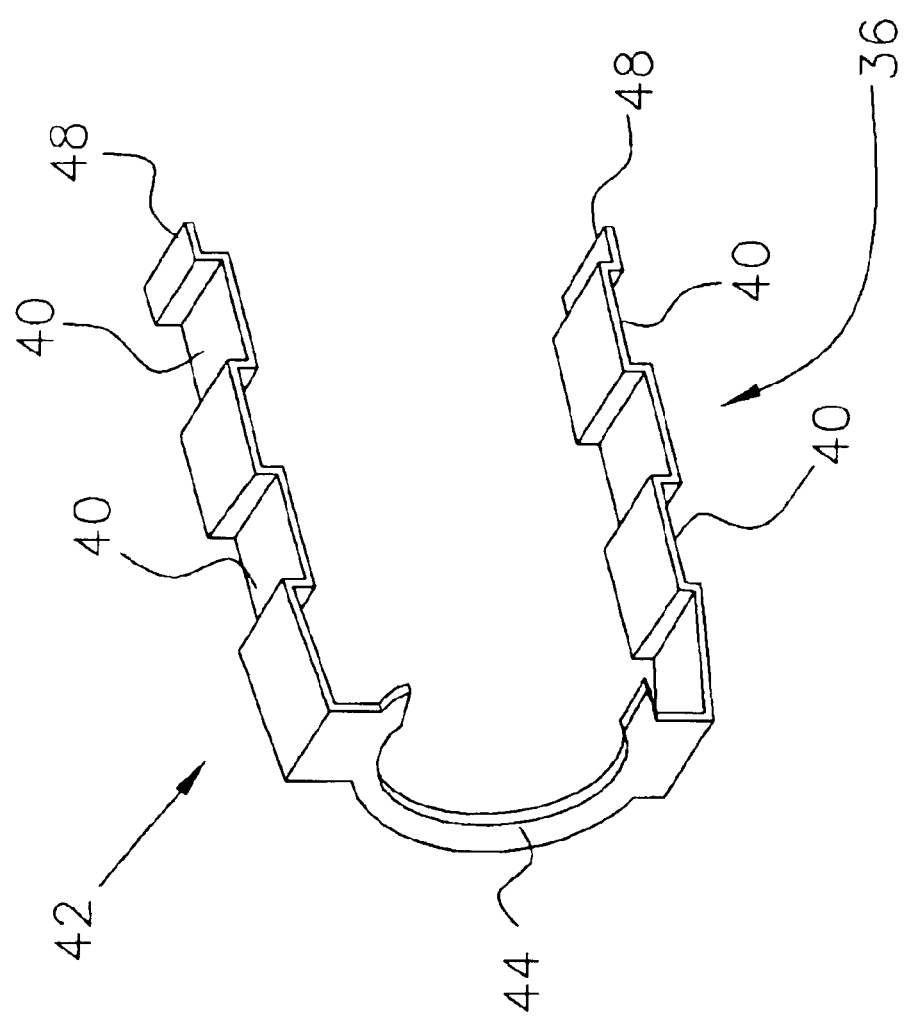

FIG. 5 is a schematic depiction of another embodiment of the invention, one of which is a partial cross-section view, with a connection of the hose to a fitting connected directly to the unit or equipment without a union connection, and further depicting alternative connections to either a flare end or to a tube end after cutting off the flare end; and FIG. 6 is a schematic depiction of a typical clamp positioner contemplated by the invention.

The present invention, which is depicted generally as 10 in the accompanying FIGS. 1–5, provides for a method of interconnecting an outdoor condenser/compressor unit 12a with an indoor evaporator unit 12b for a residential or commercial facility 14. The invention involves running a hose 16 made of material suitable for handling a refrigerant fluid between each of the respective low pressure and high pressure connectors, 18a and 18b respectively, on each of the outdoor condenser/compressor and indoor evaporator units 12a, 12b. Fitting means 20 are provided for interconnecting each of the hoses 16 to their respective unit connectors 18a, 18b.

One side 22 of each of said fitting means 20 is welded to each respective unit connector 18a, 18b. The corresponding end of each hose 16 is then clamped to an opposite side 24 of each respective fitting means 20. Each hose 16 is sealingly engaged with the respective fitting means 20.

The fitting means 20 may also optionally include a threaded union joint 26 intermediate the unit connection side and the hose connection side of the fitting means 20. Such threaded union joints 26 are known in the art and typically include an o-ring shoulder 26a on one internal side of the joint 26 against which an o-ring 26b is inserted. The rotatable union nut 26c is then threadedly engaged with a male threaded half 26d of the joint 26 and the joint is tightened so as to compress the o-ring and to seal the joint both at the threaded engagement and on the tube portion 26e extending through the union nut 26c.

Fitting means 20 are designed to be weldably engageable with each respective unit connector 18a, 18b by socket welding as shown at 28a one side 22 of said fitting means 20 into a flare connector 18c on the respective unit 12a, 12b. As mentioned above, such welding is typically done by brazing or soldering. Alternatively, the flare connector 18c can be cut off on the respective unit 12a, 12b and the remaining end of the unit tubing 18d can be socket welded as shown at 28b into the one side 22 of the fitting means 20.

A hose barb portion 30 on the opposite side 24 of each of the fitting means 20 is also provided and is designed to be insertable into the end of said hose 16 before clamping the hose 16 to the hose barb portion 30. At least two o-ring grooves 32 are provided in the hose barb portion 30 for receiving respective o-rings 34 into said grooves 32 before clamping.

Clamping is facilitated with the providing of clamp positioner means 36 extending from an intermediate location 38 on the fitting means 20 to a predetermined length so as to extend over the hose barb portion 30. The clamp positioner means 36 has grooves 40 aligned over each of said o-rings 34. Generally, the clamp positioner means 36 is a U-shaped bracket member 42 made from flat stock. The bottom of the bracket member 42 has a C-shaped flat ring 44 for rotatable snap insertion around a groove 46 located at the intermediate location 38. The grooves 40 aligned over the o-rings 34 are formed by indentation in the flat legs 48 of the U-shaped bracket member 42. Legs 48 extend from near the respective ends of the C-shaped flat ring 44. Aeroquip has a commercially available E-Z Clip fitting combination product that incorporates the clamp positioner means 36 feature of the present invention. The E-Z Clip features are also described in more detail in Aeroquip owned U.S. Pat. No. 6,101,162 issued Jan. 4, 2000 to Grau et al.

After insertion of the barb portion 30 into the hose 16, a clamp 50 is moved over and around each of the clamp positioner means grooves 40 and the clamps 50 are then crimped for sealingly engaging the hose 16 to the hose barb portion 30.

To further describe fitting means 20, it is effectively a fitting 20 for connecting a refrigerant low pressure or high pressure line 18a, 18b on an outdoor compressor/condenser unit 12a or on an indoor evaporator unit 12b to a hose line 16. It is generally an elongate hollow tube 52 with a generally internal cylindrical shape 54. One end or side 22 of the elongate hollow tube 52 may alternatively be dimensioned externally for socket welding into a flare connector 18c on the outdoor compressor/condenser unit 12a and the indoor evaporator unit 12b refrigerant lines 18d, or dimensioned internally for receiving and socket welding a straight tube refrigerant line 18d without a flared end connector 18c into said one end 22 of said elongate hollow tube 52.

An opposite end or side 24 of said elongate hollow tube 52 has a hose barb portion 30 described above along with the clamp positioner means 36 also described above.

It is understood that any o-rings used in the present invention are designed for exposure to refrigerant materials and such materials are known by those skilled in the refrigeration industry. Similarly, as previously mentioned, commercially available hoses made by some companies such as Aeroquip are also suitable for use in the invention.

Typical anticipated sizes of refrigerant lines would require ⅜ inch hoses and fittings for high pressure refrigerant lines and ⅞ inch hoses and associated fittings for low pressure refrigerant return lines. Other sizes are contemplated to be within the scope of the invention depending on federal, state, local and various standards required in such installations.

To generally summarize the relatively simple method of installing new refrigerant lines, a service technician need only run the high pressure and low pressure hoses between the units; remove the flared end of the copper tube for each line at each unit; clean the exterior surface of the cut end and the interior surface of the new fitting; insert the fitting over the tube until it stops; solder or braze the formed socket connection; install the o-rings on the hose barb portion and two clamps over the hose; insert the hose barb portion with its o-rings into the hose end and clamp the hose by crimping each clamp.

It should be understood that the preceding is merely a detailed description of one or more embodiments of this invention and that numerous changes to the disclosed embodiments can be made in accordance with the disclosure herein without departing from the spirit and scope of the invention. The preceding description, therefore, is not meant to limit the scope of the invention. Rather, the scope of the invention is to be determined only by the appended claims and their equivalents.

What is claimed is:

1. A method of interconnecting a condenser/compressor unit with a separate evaporator unit for a residential or commercial building consisting of:

using hoses made of material suitable for handling a refrigerant fluid instead of traditionally used solid tubing, for eliminating the risk of refrigerant fluid leaks in kinks along said solid tubing caused by damage to said solid tubing inside building structure or for facilitating the easier replacement of said already installed solid tubing in such building structures without opening access holes in interior wall and floor portions of said building structures;

running said hoses between each respective low pressure and high pressure connectors on each of the condenser/compressor and evaporator units, the hoses being run between the condenser/compressor unit, which is outside a building structure and the evaporator unit located inside the building structure;

providing fitting means for interconnecting each of the hoses to their respective unit connectors;

welding one side of each of said fitting means to each respective unit connector; and clamping the corresponding end of each hose to an opposite side of each respective fitting means, wherein each hose is sealingly engaged with the respective fitting means, and wherein the fitting means further comprises:

a threaded union joint intermediate the welded side of said fitting means and the hose clamped side of the fitting means, a hose barb portion on the opposite side of each of the fitting means, said hose barb portion being inserted into the end of said hose, wherein the hose is then clamped to the hose barb portion, the hose barb portion having at least two o-ring grooves and respective o-rings for installation into said grooves, clamp positioner means extending from an intermediate location on the fitting means to a predetermined length so as to extend over the hose barb portion, the clamp positioner means having grooves aligned over each of said o-rings wherein after insertion of the barb portion into the hose, a clamp is located around each of the clamp positioner means grooves and said clamps are crimped for sealingly engaging the hose to said hose barb portion.

2. The method according to Claim 1, wherein the fitting means is weldably engageable with each respective unit connector by socket welding said one side of said fitting means into a flare connector on the respective unit.

3. The method according to Claim 1, wherein the fitting means is weldably engageable with each respective unit connector by cutting off a flare connector on the respective unit and socket welding the remaining end of a unit tubing into said one side of the fitting means.

* * * * *